UNITED STATES PATENT OFFICE 2,403,794

VISIBLE LIGHT TRANSPARENT PLASTIC

Richard M. Goldrick, Arlington, and Barnard M. Marks, Newark, N. J., assignors to E. I. du Pont de Nemours & Company, Wilmington, Del., a corporation of Delaware No Drawing. Application November 19, 1943, Serial No. 510,916

9 Claims. (Cl. 260—41)

This invention relates to transparent plastics and, more particularly, to X-ray opaque, visible light transparent methyl methacrylate plastics.

An object of the present invention is to provide a methyl methacrylate plastic which is opaque to X-ray radiations but which is transparent to visible light. A further object is to provide a process of preparing such plastic which process may be employed on a commercial scale without recourse to extreme precautions against industrial poisoning. More specific objects of the invention are to provide a plastic sheet which may be used as a shield for protection against X-ray radiation and to provide a method whereby objects made of methyl methacrylate plastic may be detected and identified. Other objects will be apparent from the description of the invention given hereinafter.

The above objects are accomplished according to the present invention by dissolving an inorganic salt from the group consisting of thorium nitrate, bismuth nitrate, and bismuth trichloride, in monomeric methyl methacrylate and thereafter subjecting the resulting solution to polymerization conditions. More specifically, the process of preparing the plastic of the present invention includes the step of filtering the monomeric methyl methacrylate containing the inorganic salt dissolved therein, through activated carbon prior to subjecting the methyl methacrylate to polymerization conditions.

The present invention resides in part in the discovery that thorium nitrate, bismuth nitrate, and bismuth trichloride all have a uniquely advantageous combination of properties in that they are soluble in monomeric methyl methacrylate and, also, soluble in or compatible with polymeric methyl methacrylate in proportions such that they may be used to impart X-ray opaqueness to visible light transparent sheets and other articles of polymeric methyl methacrylate. In addition, these inorganic salts possess certain other properties such as stability and relative non-toxicity, which make them highly suitable for use in the present invention.

These are numerous other metallic salts and organo-metallic compounds of heavy metal elements which will impart X-ray opaqueness to polymeric compositions of the acrylic type. Examples of such salts and compounds include the lead, bismuth or other heavy metal salts of sulfo succinic acid esters, e. g., lead dibutyl sulfo succinate; heavy metal salts of higher fatty acids, e. g., lead laurate, mercuric oleate and the like; lead trichloroacetate; uranyl nitrate; metallic aromatic acid salts, e. g., mercury o-benzoyl-benzoate and thallium benzoate; organo-metallic compounds such as mercury diphenyl, and heavy metal salts of ortho- and pyro-alkyl phosphoric acids such as dibutyl lead orthophosphate. In addition certain organic iodine containing compounds will impart X-ray opaque characteristics to acrylic type plastic compositions e. g., triiodo benzene and ethyl iodobenzoate. However, it has been found that none of these compounds are really satisfactory for utilization in a commercial process for the production of X-ray opaque polymeric compositions comprising polymethyl methacrylate because such compounds, although they may be soluble in monomeric methyl methacrylate, are insoluble in polymeric methyl methacrylate and hence render the polymeric compositions opaque to visible light, and/or such compositions are unstable and undergo decomposition when compounded in polymethyl methacrylate plastic compositions, and/or such compounds impart visible color characteristics to the polymeric compositions rendering them non-colorless, and/or such compounds are too toxic for utilization in a commercial production process.

On the contrary, the three inorganic salts used in the present invention have the requisite solubility characteristics with respect to both monomeric and polymeric methyl methacrylate so that transparent plastics opaque to X-ray radiations may be obtained. Further, these salts are satisfactorily stable when compounded in polymeric methyl methacrylate compositions, do not impart visible color characteristics to the plastics, and are not toxic to a degree making it dangerous to use them in a commercial scale operation.

The present invention further resides in the discovery that filtering the solution of the inorganic salt in monomeric methyl methacrylate through activated carbon permits the production of a plastic completely haze-free whereas no other means of accomplishing this has been found. While other filtering media have been tried, activated carbon appears to be unique in giving a filtered solution which can be polymerized to an entirely haze-free plastic. Nevertheless, plastics of a quality entirely satisfactory for many purposes can be produced without this step.

In preparing the plastic according to the present invention, the inorganic salt may be directly dissolved in monomeric methyl methacrylate or in a syrup of polymeric methyl methacrylate dissolved in monomeric methyl methacrylate, the solution then preferably being filtered through activated carbon, and thereafter the solution is subjected to polymerization conditions. It is preferred, however, to dissolve the inorganic salt in an alcohol such as ethanol or methanol, then filter the solution through activated carbon, add monomeric methyl methacrylate to the filtered solution, and to distill off the alcohol thereby obtaining a solution of the inorganic salt in monomeric methyl methacrylate which solution is filtered through activated carbon. This filtered solution is then admixed in proper proportions with more methyl methacrylate or partially polymerized methyl methacrylate or a syrup of polymer dissolved in monomer, and the resulting mixture is polymerized to yield the polymeric X-ray opaque plastic. The filtering of the solution of the inorganic salt in alcohol through activated carbon is of advantage but it is not effective in eliminating haze from the final polymer product to anything like the extent that the second filtering step is effective for this purpose.

The polymerizable mixtures containing the opacifying inorganic salt may be polymerized and cast by any established polymerization procedure using any of the well known polymerization catalysts employed therefor. X-ray opaque sheets comprising polymeric methyl methacrylate may be prepared using the herein discussed compositions with any established sheet casting process, the specific manner in which the polymerization is carried out forming no part of the present invention.

The following examples in which all parts are given by weight unless otherwise noted, illustrate specific embodiments of the present invention:

Example I

A solution of 500 parts of thorium nitrate and 500 parts of ethanol is prepared by heating the indicated ingredients for a time sufficient to produce substantially complete solution. Thirty parts of urea, the purpose of which is to neutralize any excess nitric acid contained in the thorium nitrate, are then added to 300 parts of this alcohol salt solution and the mixture is heated at refluxing temperature for three hours. The mixture is then allowed to cool to room temperature after which it is filtered through an activated carbon filter. The filtered solution is mixed with an equal quantity of monomeric methyl methacrylate and the total mixture is charged into a suitable distillation apparatus. The alcohol component of this salt mixture is then removed by subjecting the mixture to a vacuum distillation. The resulting methyl methacrylate salt solution is filtered through an activated carbon filter. This filtrate is admixed with a sufficient quantity of partially polymerized methyl methacrylate to bring the total weight of the mixture to 1500 parts. The polymeric syrup thus produced, which possesses the following compositions:

| | Parts |
|---|---|
| Methyl methacrylate (monomer and polymer) | 1355 |
| Thorium nitrate tetrahydrate | 145 |
| Benzoyl peroxide (polymerization catalyst) | 1.61 | is polymerized to form a polymeric sheet by casting between glass plates separated by a flexible gasket.

The resulting polymeric sheet which possesses a thickness of 0.250 inch is relatively opaque to X-rays as compared to the opacity of bones of the human body.

The step of filtration through activated carbon as illustrated in this example is preferred since it insures that the resulting polymeric structure will be completely haze-free. Thus, an article prepared by a procedure comparable to that of this example, but which omitted this step, although being in all cases transparent, may possess a slight haze.

Example II

A solution of 3.6 parts of bismuth trichloride in 96.4 parts of monomeric methyl methacrylate is prepared by subjecting a mixture of the two ingredients to agitation at a slightly elevated temperature for a sufficient length of time to produce complete solution. The resulting solution is filtered through an activated carbon filter and is then cast in the form of an article possessing a thickness of one-half inch, by subjecting the solution to polymerization conditions while confined in a suitable mold for a sufficient length of time to completely polymerize the same. The article produced thereby exhibits satisfactory characteristics with regard to transparency to visible light and opacity to X-ray radiations.

Example III

A solution of 5.5 parts of bismuth nitrate pentahydrate in 94.5 parts of monomeric methyl methacrylate is made up, treated and polymerized in a fashion similar to that disclosed in Example II. The polymeric structure produced thereby possesses characteristics which are completely satisfactory with respect to transparency to visible light and opacity to X-ray radiations.

It will be understood that the above examples are merely illustrative and that broadly the present invention comprises the production of a visible light transparent plastic relatively opaque to X-ray radiations by dissolving one of the above discussed inorganic salts in monomeric methyl methacrylate and subjecting the resulting solution to polymerization conditions.

Since the opacity to X-ray radiations of the plastic of this invention is a relative matter, it will be appreciated that the concentration of the inorganic salt in the plastic will vary considerably depending upon the conditions in any given case. Obviously, the thickness of the plastic sheet or article being made will affect the X-ray opacity, the concentration of the inorganic salt in the plastic being inversely proportional to the thickness of the sheet for a given degree of opacity. Again, the opacity varies for a given concentration of inorganic salt, depending upon whether a thorium salt or a bismuth salt is used.

To illustrate the X-ray screening properties of these inorganic salts it should be noted that a concentration of at least 4% by weight of the polymer in the plastic is required in the case of thorium nitrate, calculated as thorium, to impart X-ray screening properties in a polymeric methyl methacrylate sheet 0.250 inch in thickness comparable to the X-ray screening properties possessed by the bones of the human body. For a sheet only 0.125 inch in thickness this proportion of thorium nitrate would have to be doubled to obtain equivalent X-ray screen properties. In the case of bismuth nitrate or bismuth trichloride, a concentration of at least 4.7%, calculated as bismuth, by weight of the polymer in the plastic is required to impart X-ray screen properties in a polymeric methyl methacrylate sheet 0.250 inch in thickness comparable to the X-ray screen properties possessed by the bones of the human body.

While the lower limit of the concentration of the opacifying inorganic salt is, of course, important in that a certain minimum concentration is necessary to insure that the plastic has the desired X-ray screening property, the upper limit is not so important, always providing that it does not exceed the proportion of inorganic salt that will remain compatible with the polymeric material; the opacifying salt in proportions higher than those compatible with the polymeric methyl methacrylate will obviously result in a plastic which is not perfectly transparent to visible light. Although the upper limit of the concentration of the inorganic salt is not important, nevertheless it is desirable to employ substantially no more of the salt than is necessary to impart the desired opacification in any particular application because high concentration of the salt in the plastic may tend to undergo slight decomposition when the plastic is exposed to radiations for prolonged periods.

The chief reason that it is preferred to dissolve the inorganic salt in alcohol, then add monomeric methyl methacrylate to the resulting solution and distill off the alcohol to get the solution of the salt in monomeric methyl methacrylate, is that in this manner a higher proportion of the salt may be dissolved in the monomer than in the case where the salt is dissolved directly in the monomer. In some instances it may be desirable to employ a greater proportion of the salt than can be dissolved directly in the monomer, at least under practical conditions, and then the use of this preferred method is necessitated. Instead of ethanol or methanol, other volatile organic solvents such as acetone or methyl acetate may be used to dissolve the opacifying salt. However, as ethanol and methanol are both relatively inexpensive and readily available and, of great importance, are so easily separated from monomeric methyl methacrylate by distillation, they normally would be greatly preferred as the solvent.

The present invention provides a method for the X-ray opacification of polymeric structures comprising polymethyl methacrylate. This method is especially suited for utilization on a commercial scale for a number of reasons. First and foremost of these reasons is the fact that this method may be employed as an improvement in already established commercial procedures for the production of polymeric structures for polymethyl methacrylate. Thus, it is possible to modify existing formulations comprising plasticizers, fillers, pigments, dyes or other copolymerized materials provided such formulations comprise at least 70% methyl methacrylate by weight. Existing polymerization techniques, casting, molding, syruping and sheet casting procedures may be employed without recourse to any substantial charge. Furthermore, the polymeric compositions derived thereby may be molded or formed according to established procedures. The relative low cost of the discussed opacifying agents, their general availability and non-toxic nature also are reasons for the adaptability of the present process to a commercial scale.

The polymeric products of the present invention may be employed for substantially all uses for which polymethyl methacrylate plastic compositions were known to be useful. A particular use to which these polymeric materials may be placed is as a substitute for lead glass used as screening or shielding materials on X-ray equipment and X-ray works. In this respect these compositions are far superior to lead glass in that these polymeric sheets may be readily formed in many compound shapes such as about parts of the human body.

Another application for the present process is for characterizing plastic compositions so that they may be identified or detected. Thus, the process may be used for marking such structures as dentures made of polymethyl methacrylate so that the identity and source of the material from which they are made, may be traced. Likewise, the process may be used to impart X-ray opaque qualities to polymethyl methacrylate sheeting such as that used on combat aircraft in order that fragments of the same which become imbedded in parts of the human body may be located.

As many apparently widely different embodiments of this invention may be made without departing from the spirit and scope thereof, it is to be understood that the invention is not limited to the specific embodiments thereof except as defined in the appended claims.

We claim:

1. A visible light transparent plastic sheet at least as opaque to X-ray radiations as the bones of the human body, said plastic comprising polymeric methyl methacrylate and, in compatible admixture therewith, thorium nitrate, the proportion of said thorium nitrate for an 0.250 inch thickness of said sheet being at least 4% by weight of said polymeric methyl methacrylate, when calculated as thorium, and the proportion of said thorium nitrate being in inverse proportion to the thickness of said sheet for other thicknesses of said sheet.

2. A visible light transparent plastic sheet at least as opaque to X-ray radiations as the bones of the human body, said plastic comprising polymeric methyl methacrylate and, in compatible admixture therewith, bismuth nitrate, the proportion of said bismuth nitrate for an 0.250 inch thickness of said sheet being at least 4.7% by weight of said polymeric methyl methacrylate, when calculated as bismuth, and the proportion of said bismuth nitrate being in inverse proportion to the thickness of said sheet for other thicknesses of said sheet.

3. A visible light transparent plastic sheet at least as opaque to X-ray radiations as the bones of the human body, said plastic comprising polymeric methyl methacrylate and, in compatible admixture therewith, bismuth trichloride, the proportion of said bismuth trichloride for an 0.250 inch thickness of said sheet being at least 4.7% by weight of said polymeric methyl methacrylate, when calculated as bismuth, and the proportion of said bismuth trichloride being in inverse proportion to the thickness of said sheet for other thicknesses of said sheet.

4. Process of preparing a product as defined in claim 8, which comprises dissolving an inorganic salt from the group consisting of thorium nitrate, bismuth nitrate, and bismuth trichloride, in monomeric methyl methacrylate and subjecting the resulting solution to polymerization conditions.

5. Process of preparing a product as defined in claim 8, which comprises dissolving an inorganic salt from the group consisting of thorium nitrate, bismuth nitrate, and bismuth trichloride, in monomeric methyl methacrylate, filtering the resulting solution through activated carbon, and thereafter subjecting the filtered solution to polymerization conditions.

6. Process of preparing a product as defined in claim 8, which comprises dissolving an inorganic salt from the group consisting of thorium nitrate, bismuth nitrate, and bismuth trichloride, in a lower saturated monohydric alcohol having from 1 to 2 carbon atoms, inclusive, adding monomeric methyl methacrylate to the resulting solution, distilling off said alcohol from said solution to obtain a solution of said inorganic salt in monomeric methyl methacrylate, filtering this latter solution through activated carbon, adding a quantity of liquid polymerizable methyl methacrylate to said solution, and thereafter subjecting the resulting composition to polymerization conditions.

7. Process of preparing a product as defined in claim 8, which comprises dissolving an inorganic salt from the group consisting of thorium nitrate, bismuth nitrate, and bismuth trichloride, in a lower saturated monohydric alcohol containing from 1 to 2 carbon atoms, inclusive, filtering the resulting solution through activated carbon, adding monomeric methyl methacrylate to the filtered solution, distilling off said alcohol from said solution to obtain a solution of said inorganic salt in monomeric methyl methacrylate, filtering this latter solution through activated carbon, adding a quantity of liquid polymerizable methyl methacrylate to said solution, and thereafter subjecting the resulting composition to polymerization conditions.

8. A visible light transparent plastic comprising polymeric methyl methacrylate and, in compatible admixture therewith, an inorganic salt from the group consisting of thorium nitrate, bismuth nitrate and bismuth trichloride, said inorganic salt being present in the plastic in an amount sufficient to substantially reduce its ability to transmit X-ray radiations.

9. A visible light transparent plastic comprising polymeric methyl methacrylate and, in compatible admixture therewith, an inorganic salt from the group consisting of thorium nitrate, bismuth nitrate, and bismuth trichloride, said inorganic salt being present in the plastic in an amount sufficient to render said plastic at least as opaque to X-ray radiations as the bones of the human body.

RICHARD M. GOLDRICK.
BARNARD M. MARKS.